United States Patent
Gregory

(10) Patent No.: US 9,995,328 B2
(45) Date of Patent: Jun. 12, 2018

(54) BRACKET COMBINATION FOR ATTACHING A LEG TO AN ITEM OF FURNITURE

(71) Applicant: Virco Mfg. Corporation, Torrance, CA (US)

(72) Inventor: John W. Gregory, Enola, AR (US)

(73) Assignee: VIRCO MFG. CORPORATION, Torrance, CA (US)

(*) Notice: Subject to any disclaimer, the term of this patent is extended or adjusted under 35 U.S.C. 154(b) by 264 days.

(21) Appl. No.: 14/918,206

(22) Filed: Oct. 20, 2015

(65) Prior Publication Data

US 2017/0108022 A1      Apr. 20, 2017

(51) Int. Cl.
| | |
|---|---|
| *F16M 11/20* | (2006.01) |
| *F16B 12/44* | (2006.01) |
| *F16M 11/32* | (2006.01) |
| *F16B 3/00* | (2006.01) |
| *A47B 13/02* | (2006.01) |

(52) U.S. Cl.
CPC ............ *F16B 12/44* (2013.01); *A47B 13/021* (2013.01); *F16B 3/00* (2013.01); *F16M 11/32* (2013.01); *A47B 2200/002* (2013.01)

(58) Field of Classification Search
CPC .... A47B 3/06; A47B 2013/022; A47B 13/003
See application file for complete search history.

(56) References Cited

U.S. PATENT DOCUMENTS

| | | | | |
|---|---|---|---|---|
| 2,710,781 A | * | 6/1955 | Haynes, Sr. ............ | A47B 3/06 108/156 |
| 2,973,233 A | * | 2/1961 | McPhee .................. | F16B 12/48 248/188 |
| 3,504,877 A | * | 4/1970 | Lyon, Sr. .............. | A47B 13/021 248/188 |
| 4,003,537 A | * | 1/1977 | Mutchnik .............. | A47B 11/00 248/188 |
| 4,011,821 A | * | 3/1977 | Neal ........................ | A47B 3/12 108/156 |
| 6,629,506 B2 | * | 10/2003 | Park ........................ | A47B 9/18 108/156 |
| 6,820,847 B2 | | 11/2004 | Camarota et al. | |

OTHER PUBLICATIONS

Fletcher, Scott, Design U.S. Appl. No. 29/542,756 titled "Furniture Leg Attachment" filed Oct. 16, 2015, 15 pages.

* cited by examiner

*Primary Examiner* — Amy J. Sterling
(74) *Attorney, Agent, or Firm* — Knobbe, Martens, Olson & Bear, LLP

(57) ABSTRACT

A kit includes a furniture module bracket and a furniture leg. The furniture module bracket has a flange defining a furniture leg attachment opening. Protrusions are attached to the flange to define a keyway between adjoining protrusions. One of the protrusions defines a protrusion aperture. The furniture leg comprises a furniture leg bracket attached to a support member. The furniture leg bracket defines keys which can pass through the keyways. At least one of the keys defines a key aperture. The furniture leg can be attached to the furniture module by (i) inserting the furniture leg bracket into the furniture leg attachment opening, (ii) rotating the support member until the keys are no longer aligned with the keyways and (iii) securing the furniture module bracket to the furniture leg bracket with a fastener disposed within an aligned key aperture and a protrusion aperture.

13 Claims, 4 Drawing Sheets

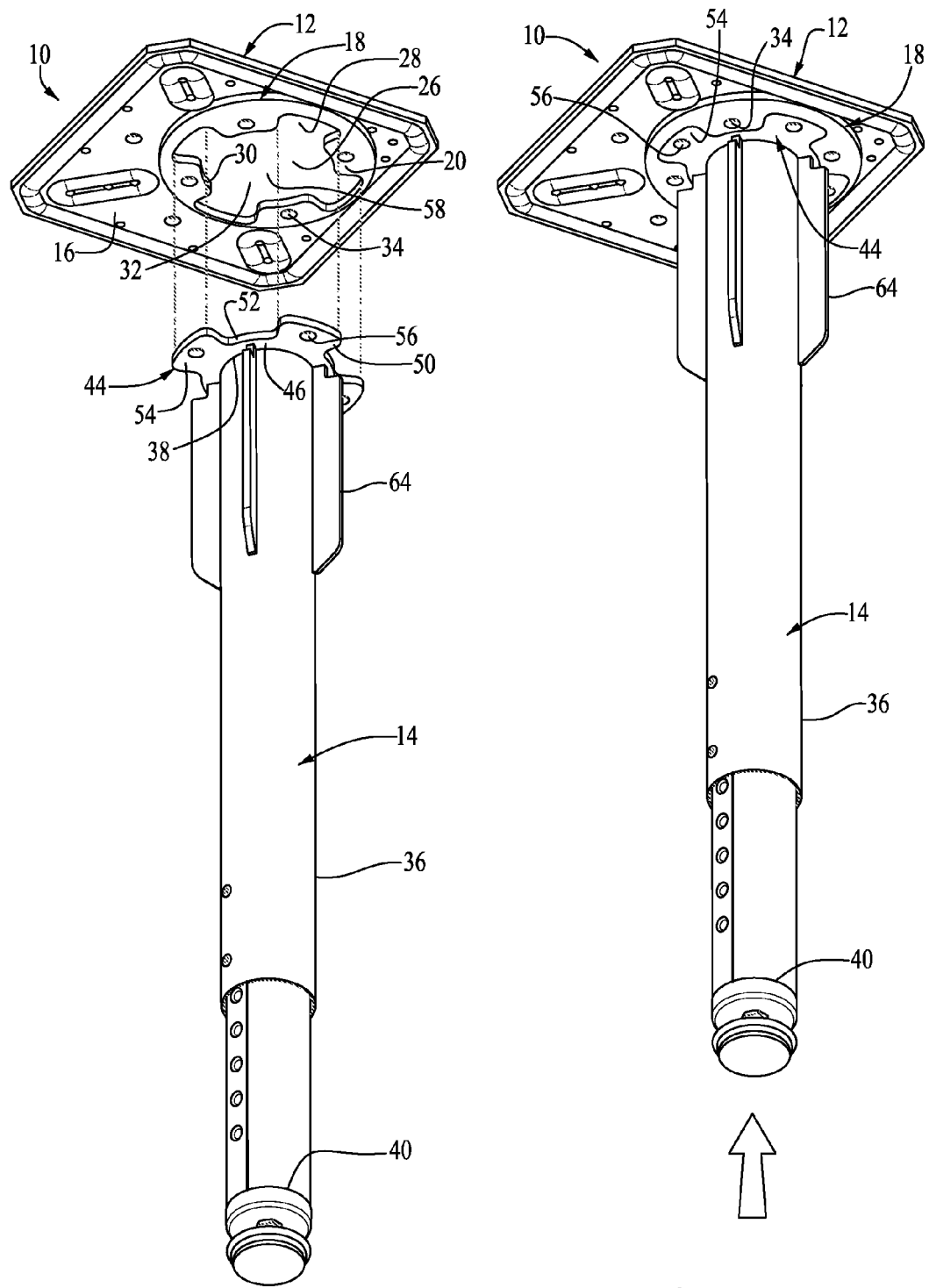

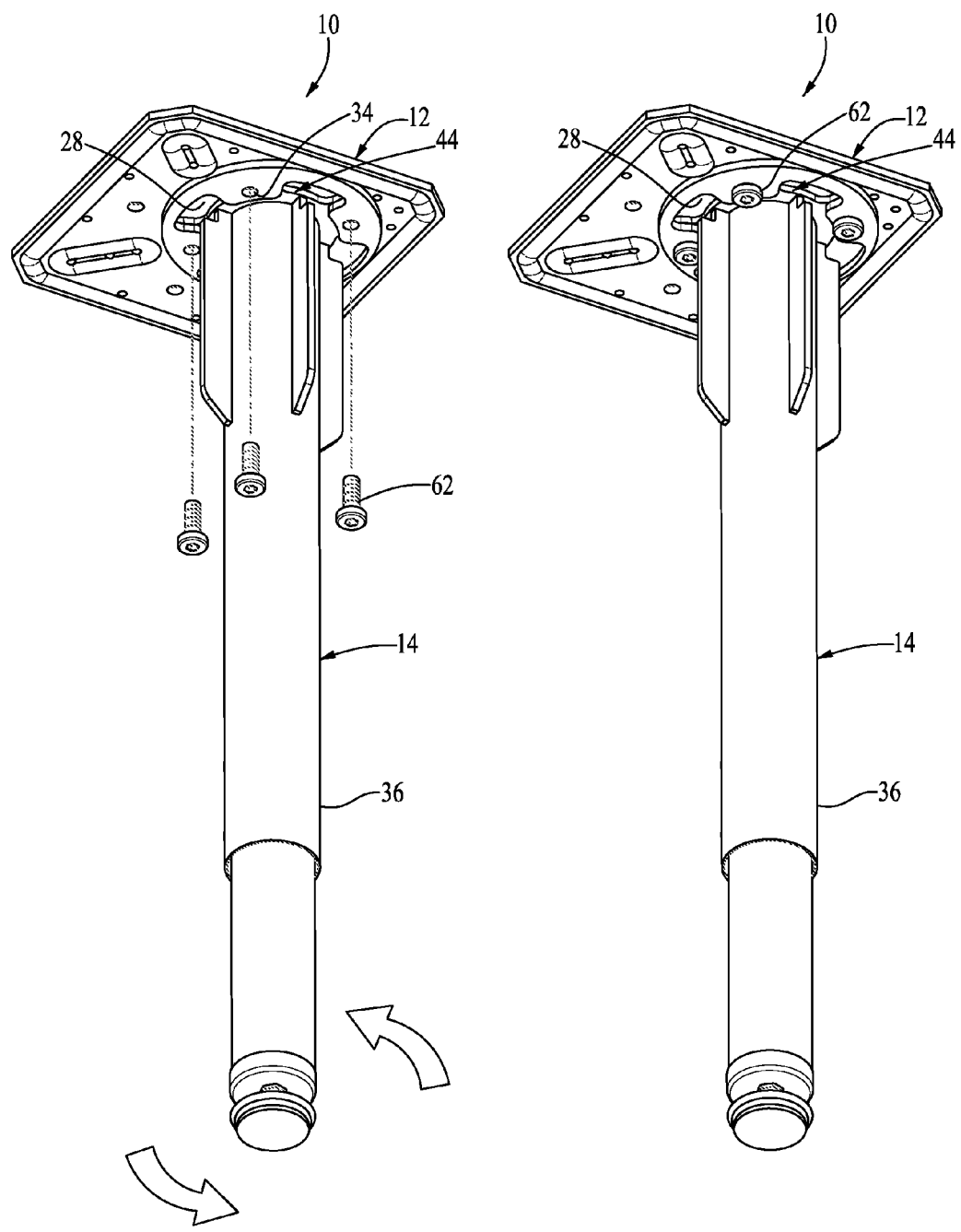

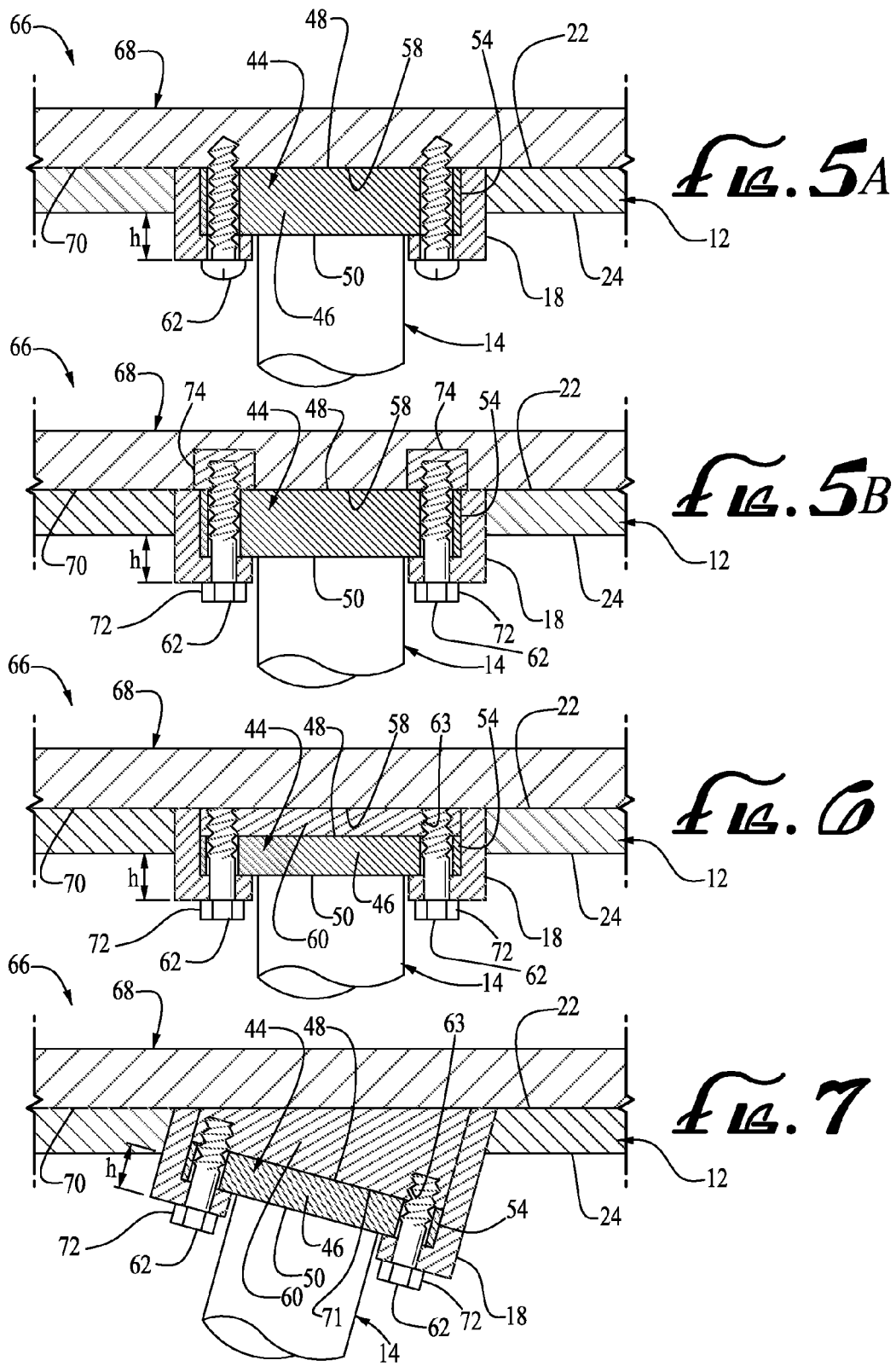

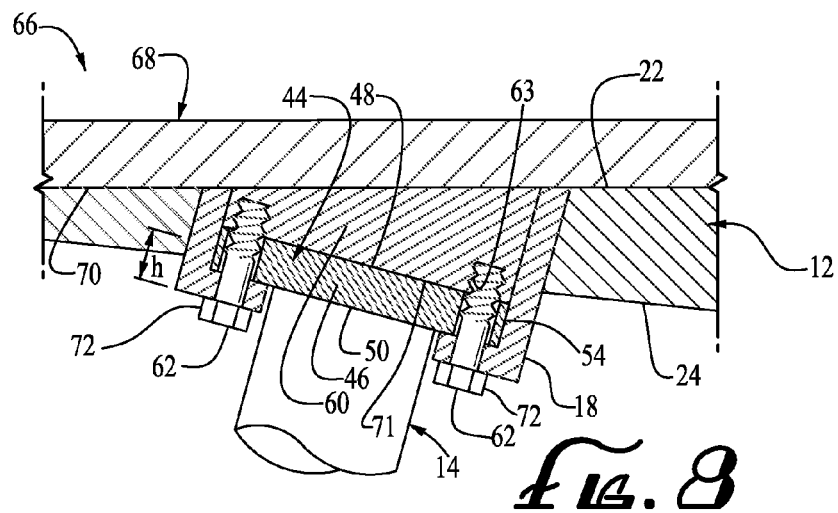
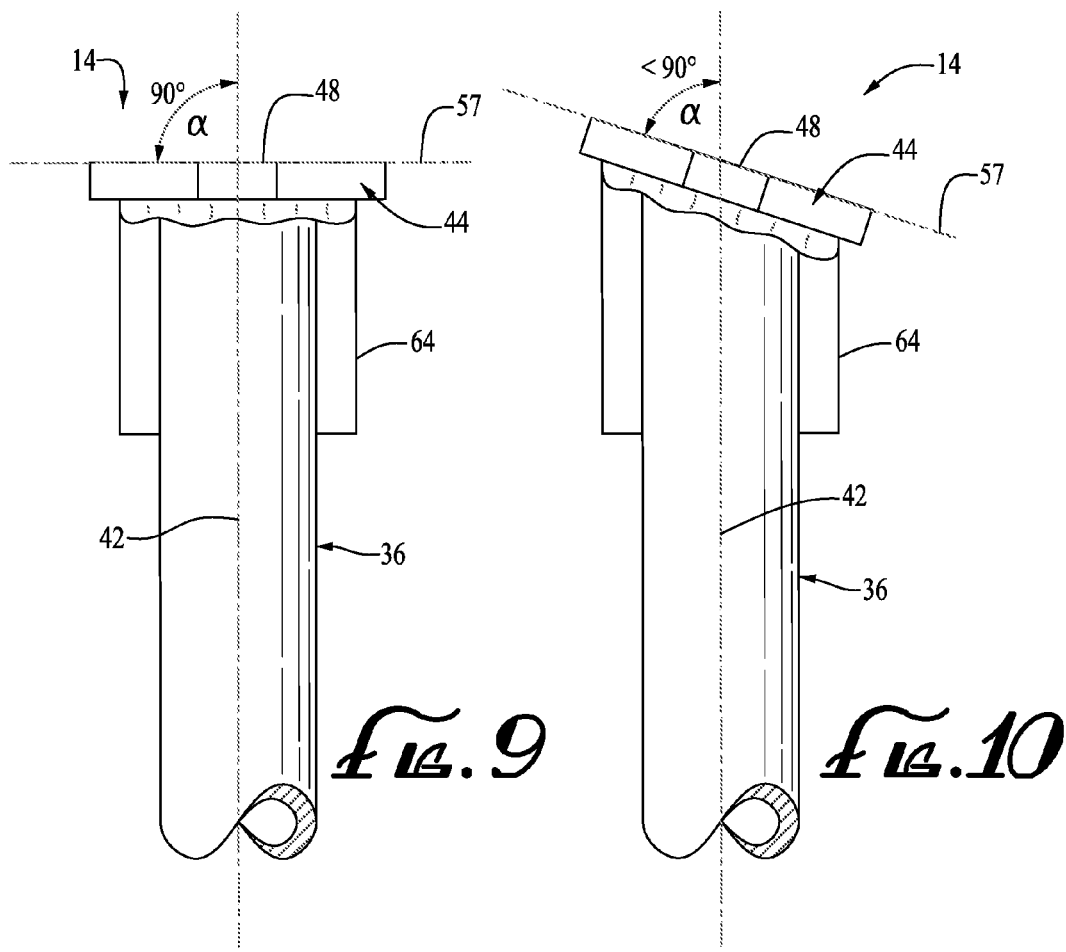

BRACKET COMBINATION FOR ATTACHING A LEG TO AN ITEM OF FURNITURE

BACKGROUND

The shipment of furniture items, such as tables, desks and chairs, from manufacturers to suppliers or from suppliers to end users is made unduly expensive by the fact that the legs on such furniture items take up an inordinate amount of shipping crate volume.

Furniture shippers have attempted to ship furniture items in two separate packages, one for furniture modules without legs and one for the legs—leaving it up to the receiver of the shipment to assemble the legs onto the furniture modules. However, to make it simple and easy for the shipment receiver to accomplish the attachment of the legs to furniture modules, it has been believed necessary for the manufacturer to attach a large attachment bracket to each of the legs. The large size of the attachment brackets again requires undue amounts of shipping crate volume and results in unduly high shipping costs.

Accordingly, there is a need for a new attachment devices and methods for shipping items of furniture in a cost efficient manner.

SUMMARY

The invention satisfies this need. In one aspect, the invention is a kit comprising a furniture module bracket and a furniture leg.

The furniture module bracket comprises i) a furniture module bracket base plate having a furniture module bracket base plate upper surface and a furniture module bracket base plate lower surface; ii) an enclosed flange extending away from the furniture module bracket base plate lower surface, the enclosed flange forming a furniture leg attachment opening; and iii) at least three inwardly extending protrusions attached to the enclosed flange and spaced apart from one another to define a keyway between each pair of adjoining inwardly extending protrusions. Each of the protrusions has a protrusion distal edge, and the protrusion distal edges of all inwardly extending protrusions define a protrusion distal edge central opening. At least one of the inwardly extending protrusions defines an inwardly extending protrusion securing aperture.

The furniture leg comprises i) an elongate support member having a proximal end, a distal end and a longitudinal axis; and ii) a furniture leg bracket attached to the proximal end of the elongate support member. The furniture leg bracket comprises a furniture leg bracket base plate having a furniture leg bracket base plate upper surface, a furniture leg bracket base plate lower surface and an furniture leg bracket base plate exterior edge. The furniture leg bracket base plate exterior edge defines at least three outwardly extending keys spaced apart from one another and each key is sized and dimensioned to pass through a keyway between a pair of adjoining inwardly extending protrusions in the furniture module bracket. At least one of the keys defines a key securing aperture. The keys are typically defined along the furniture leg bracket base plate exterior edge such that, when one of the keys is aligned with a keyway in the furniture module bracket, all of the keys are aligned with a keyway. Each of the keys has a key distal edge and the key distal edges of all keys are sized and dimensioned to be retained within the enclosed flange of the furniture module bracket. The key distal edges of all keys are also sized and dimensioned to prevent the passage of the furniture leg bracket through the protrusion distal edge central opening except when each of the keys is aligned with a keyway. The furniture leg bracket is attached to the elongate support member such that the keys extend away from the longitudinal axis of the elongate support member.

The furniture leg can be securely attached to the furniture module by (i) inserting the furniture leg bracket into the furniture leg attachment opening after aligning each key with a keyway and thrusting the proximal end of the elongate support member into the protrusion distal edge central opening, (ii) rotating the elongate support member to rotate the furniture leg bracket until the keys are no longer aligned with the keyways and until at least one key aperture is aligned with an inwardly extending protrusion securing aperture to form at least one aligned key aperture and inwardly extending protrusion securing aperture and (iii) securing the furniture module bracket to the furniture leg bracket with a fastener disposed within the at least one aligned key aperture and inwardly extending protrusion securing aperture.

In a second aspect, the invention is a furniture assemblage employing the furniture module bracket and furniture leg described above.

In a third aspect, the invention is a method of efficiently employing the furniture module bracket and furniture leg described above in the manufacture and assembly of a furniture assemblage which is shipped from a first site to a second site.

DRAWINGS

These and other features, aspects and advantages of the present invention will become better understood with reference to the following description, appended claims, and accompanying drawings where:

FIG. 1 is a perspective exploded view of a kit having features of the invention;

FIG. 2 is a perspective view illustrating a step in the assembly of the kit illustrated in FIG. 1;

FIG. 3 is a perspective view illustrating another step in the assembly of the kit illustrated in FIG. 1;

FIG. 4 is a perspective view illustrating a final step in the assembly of the kit illustrated in FIG. 1;

FIG. 5A is a cross-sectional detail view illustrating a first assembled kit having features of the invention;

FIG. 5B is a cross-sectional detail view illustrating a second assembled kit having features of the invention;

FIG. 6 is a cross-sectional detail view illustrating a third assembled kit having features of the invention;

FIG. 7 is a cross-sectional detail view illustrating a fourth assembled kit having features of the invention;

FIG. 8 is a cross-sectional detail view illustrating a fifth assembled kit having features of the invention;

FIG. 9 is a side detail view of a first furniture leg useable in the invention; and FIG. 10 is a side detail view of a second furniture leg useable in the invention.

DETAILED DESCRIPTION

The following discussion describes in detail one or more embodiments of the invention and several variations of those embodiments. This discussion should not be construed, however, as limiting the invention to those particular embodiments. Practitioners skilled in the art will recognize numerous other embodiments as well.

Definitions

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers, ingredients or steps.

The Invention

In one aspect, the invention is a kit 10 comprising a furniture module bracket 12 and a furniture leg 14. The kit 10 is best seen in FIG. 1.

As best seen in FIGS. 1, 5A, 5B and 6-8, the furniture module bracket 12 comprises i) a furniture module bracket base plate 16, ii) an enclosed flange 18 and iii) at least three inwardly extending protrusions 20 attached to the enclosed flange 18.

The furniture module bracket base plate 16 has a furniture module bracket base plate upper surface 22 and a furniture module bracket base plate lower surface 24. Typically, both the furniture module bracket base plate upper surface 22 and the furniture module bracket base plate lower surface 24 are flat and smooth.

The enclosed flange 18 extends away from the furniture module bracket base plate lower surface 24, typically by a height distance h between about ¼ inches and about 1 inch, and provides a furniture leg attachment opening 26. Typically, the enclosed flange 18 is circular and disposed perpendicular to the module bracket base plate lower surface 24.

The at least three inwardly extending protrusions 20 are spaced apart from one another to define a keyway 28 between each pair of adjoining inwardly extending protrusions 20. Typically, the inwardly extending protrusions 20 are equally spaced apart from one another. Each of the protrusions 20 has a protrusion distal edge 30, and the protrusion distal edges 30 of all inwardly extending protrusions 20 define a protrusion distal edge central opening 32. The protrusion distal edge central opening 32 can be circular.

At least one of the inwardly extending protrusions 20 defines an inwardly extending protrusion securing aperture 34. Typically, each inwardly extending protrusion 20 defines an inwardly extending protrusion securing aperture 34.

Typically, the furniture module bracket base plate 16 is made from a metal, such as a steel, although other suitable materials can be used—depending on the application.

The furniture leg 14 is best seen in FIGS. 1, 5A, 5B and 6-10. The furniture leg comprises i) an elongate support member 36 having a proximal end 38, a distal end 40 and a longitudinal axis 42; and ii) a furniture leg bracket 44 attached to the proximal end 38 of the elongate support member 36. Typically, both the furniture leg 14 and the furniture leg bracket 44 are metal, such as steel, and the furniture leg bracket 44 is attached to the proximal end 38 of the elongate support member 36 by welding.

The furniture leg bracket 44 comprises a furniture leg bracket base plate 46 having a furniture leg bracket base plate upper surface 48, a furniture leg bracket base plate lower surface 50 and a furniture leg bracket base plate exterior edge 52.

The furniture leg bracket base plate exterior edge 52 defines at least three outwardly extending keys 54 spaced apart from one another, typically 3-6 keys 54. The furniture leg bracket 44 is attached to the elongate support member 36 such that the keys 54 extend away from the longitudinal axis 42 of the elongate support member 36.

Typically, the keys 54 are identical to one another and are equally spaced apart from one another. Each key 54 is sized and dimensioned to pass through a keyway 28 between a pair of adjoining inwardly extending protrusions 20 in the furniture module bracket 14. The keys 54 are typically defined along the furniture leg bracket base plate exterior edge 52 such that, when one of the keys 54 is aligned with a keyway 28 in the furniture module bracket 12, all of the keys 54 are aligned with a keyway 28. Each of the keys 54 has a key distal edge 30 and the key distal edges 30 of all keys 54 are sized and dimensioned to be retained within the enclosed flange 18 of the furniture module bracket 12. The key distal edges of all keys 54 are also sized and dimensioned to prevent the passage of the furniture leg bracket 44 through the protrusion distal edge central opening 32 except when each of the keys 54 is aligned with a keyway 28.

In the invention, at least one of the keys 54 defines a key securing aperture 56. Typically, each of the keys 54 defines a key securing aperture 56.

IAs best seen in FIGS. 9 and 10, the furniture leg bracket base plate upper surface 48, in a typical embodiment, is disposed along a furniture leg bracket upper surface plane 57 and the furniture leg bracket 44 is attached to the proximal end 38 of the elongate support member 36 such that the furniture leg bracket 44 plane is disposed at an angle between about 75 deg. and about 105 deg., such as 90 deg., with respect to the longitudinal axis 42 of the elongate support member 36.

In the embodiment illustrated in FIGS. 5A and 5B, the enclosed flange 18 is disposed around a furniture module bracket base plate central opening 58. In the embodiment illustrated in FIGS. 6-8, the furniture module bracket 12 further comprises a furniture leg bracket contact plate 60 disposed within the enclosed flange 18. The furniture leg bracket contact plate 60 prevents the furniture leg bracket 44 from rubbing against the bottom surface 70 of a furniture module 68 when the furniture leg 14 is attached to the bottom surface 70 of a furniture module 68 using the furniture module bracket 12.

FIGS. 7 and 8 illustrate embodiments wherein the bottom surface contact plate 60 has a lower surface 71 which is not parallel with the furniture module bracket base plate upper surface 22. As illustrated in FIGS. 7 and 8, this facilitates the attachment of furniture legs 14 to the bottom surface 70 of a furniture module 68 in a splayed outward matter—wherein the longitudinal axis 42 of each furniture leg 14 is disposed with respect to the bottom surface 70 of the furniture module 68 at an angle α less than 90 deg., such as between about 75 deg. and about 89.99 deg.

The furniture leg 14 can be securely attached to the furniture module 68 by (i) inserting the furniture leg bracket 44 into the furniture leg attachment opening 26 after aligning each key 54 with a keyway 28 and thrusting the proximal end 38 of the elongate support member 36 into the protrusion distal edge central opening 32, (ii) rotating the elongate support member 36 to rotate the furniture leg bracket 44 until the keys 54 are no longer aligned with the keyways 28 and until at least one key aperture 56 is aligned with an inwardly extending protrusion securing aperture 34 to form at least one aligned key aperture 56 and inwardly extending protrusion securing aperture 34 and (iii) securing the furniture module bracket 12 to the furniture leg bracket 44 with a fastener 62 disposed within the at least one aligned key aperture 56 and inwardly extending protrusion securing aperture 34. Typically, such fasteners 62 are bolts 72 or screws. In the embodiments illustrated in FIGS. 6-8, the fasteners 62 are bolts which thread into threaded apertures 63 defined in the central plate 60.

In the embodiment illustrated in FIG. 1-4, the furniture leg 14 can further comprise a plurality of stiffener elements 64 disposed spaced apart from one another around the proximal end 38 of the furniture leg 14.

As best seen in FIGS. 1-4, the furniture leg 14 can be securely attached to the furniture module 68 by (i) inserting the furniture leg bracket 44 into the furniture leg attachment opening 26 after aligning each key 54 with a keyway 28 and thrusting the proximal end 38 of the elongate support member 36 into the protrusion distal edge central opening 32, (ii) rotating the elongate support member 36 to rotate the furniture leg bracket 44 until the keys 54 are no longer aligned with the keyways 28 and until at least one key aperture 56 is aligned with an inwardly extending protrusion securing aperture 34 to form at least one aligned key aperture 56 and inwardly extending protrusion securing aperture 34 and (iii) securing the furniture module bracket 12 to the furniture leg bracket 44 with a fastener 62 disposed within the at least one aligned key aperture 56 and inwardly extending protrusion securing aperture 34.

In a second aspect, the invention is a furniture assemblage 66 employing the furniture module bracket 12 and the furniture leg 14 described above. The furniture assemblage 66 is best seen in FIGS. 4-8.

The furniture assemblage 66 comprises a furniture module 68 having a bottom surface 70, the furniture module bracket 12 attached to the bottom surface 70 of the furniture module 68 and at least three of the furniture legs 14 attached to the furniture module 68.

Each of the at least three furniture legs 14 is attached to the furniture module 68 with the furniture leg bracket 44 disposed within the furniture leg attachment opening 26 such that (i) each key 54 is within the protrusion distal edge central opening 32, (ii) each key 54 in unaligned with a keyway 28, (iii) at least one key aperture 56 is aligned with an inwardly extending protrusion securing aperture 34 to form at least one aligned key aperture 56 and inwardly extending protrusion securing aperture 34 and (iv) the furniture module bracket 12 is secured to the furniture leg bracket 44 with a fastener 62 disposed within the at least one aligned key aperture 56 and an inwardly extending protrusion securing aperture 34.

The furniture module bracket 12 is typically secured to the furniture leg bracket 44 with wood screws or bolts 72. In the embodiment illustrated in FIG. 5B, the furniture module bracket 12 is secured to the furniture leg bracket 44 with bolts 72 threaded into inlayed nuts 74 disposed within the bottom surface 70 of the furniture module 68 opposite each inwardly extending protrusion securing aperture 34.

In a third aspect, the invention is a method of efficiently employing the furniture module bracket 12 and furniture leg 14 described above in the manufacture and assembly of a furniture assemblage 66 which is shipped from a first site to a second site more than about five miles apart. The method is best seen in FIGS. 1-4.

The method comprises the steps of (i) providing a furniture module 68 having a bottom surface 70, (ii) attaching the furniture module bracket 12 to the lower surface of the furniture module 68, (iii) providing at least three of the furniture legs 14, (iv) shipping the furniture assemblage 66 from the first site to the second site; (v) shipping the at least three furniture legs 14 from the first site to the second site, while the at least three furniture legs 14 are disassembled from the furniture module 68, (vi) at the second site, attaching the at least three furniture legs 14 to the lower side of the furniture module 68.

The attachment of the at least three furniture legs 14 to the lower side of the furniture module 68 is accomplished by (i) inserting the furniture leg bracket 44 into the furniture leg attachment opening 26 after aligning each key 54 with a keyway 28 and thrusting the proximal end 38 of the elongate support member 36 into the protrusion distal edge central opening 32, (ii) rotating the elongate support member 36 to rotate the furniture leg bracket 44 until the keys 54 are no longer aligned with the keyways 28 and until at least one key aperture 56 is aligned with an inwardly extending protrusion securing aperture 34 to form at least one aligned key aperture 56 and inwardly extending protrusion securing aperture 34; and (iii) securing the furniture module bracket 12 to the furniture leg bracket 44 with a fastener 62 disposed within the at least one aligned key aperture 56 and inwardly extending protrusion securing aperture 34.

As illustrated in FIG. 5B, an inlayed nut 74 can be retained within the bottom surface 70 of the furniture module 68 opposite each inwardly extending protrusion securing aperture 34, and the step of securing the furniture module bracket 12 to the furniture leg bracket 44 is accomplished by placing a bolt 72 within the at least one aligned key aperture 56 and an inwardly extending protrusion securing aperture 34, and securing each bolt 72 to an inlayed nut 74.

The invention provides new attachment devices and methods for shipping items of furniture in a cost efficient manner. Unlike attachment devices and methods of the prior art, the attachment devices and methods of the invention allow the shipment of furniture items in containers of markedly reduced size—resulting in markedly decreased costs.

Having thus described the invention, it should be apparent that numerous structural modifications and adaptations may be resorted to without departing from the scope and fair meaning of the instant invention as set forth herein above and described herein below by the claims.

What is claimed is:
1. A kit comprising:
 a) a furniture module bracket comprising:
  i) a furniture module bracket base plate having a furniture module bracket base plate upper surface and a furniture module bracket base plate lower surface;
  ii) an enclosed flange extending away from the furniture module bracket base plate lower surface, the enclosed flange forming a furniture leg attachment opening; and
  iii) at least three inwardly extending protrusions attached to the enclosed flange and spaced apart from one another to define a keyway between each pair of adjoining inwardly extending protrusions, each of the protrusions having a protrusion distal edge, the protrusion distal edges of all inwardly extending protrusions defining a protrusion distal edge central opening, at least one of the inwardly extending protrusions defining an inwardly extending protrusion securing aperture; and
 b) a furniture leg comprising:
  i) an elongate support member having a proximal end, a distal end and a longitudinal axis; and
  ii) a furniture leg bracket attached to the proximal end of the elongate support member, the furniture leg bracket comprising a furniture leg bracket base plate having a furniture leg bracket base plate upper surface, a furniture leg bracket base plate lower surface and an furniture leg bracket base plate exterior edge, the furniture leg bracket base plate exterior edge defining at least three outwardly extending keys spaced apart from one another, each key being sized and dimensioned to pass through a keyway between a pair of adjoining inwardly extending protrusions in the furniture module bracket, at least one of the keys defining a key securing aperture, each of the keys having a key distal edge, the key distal edges of all keys being sized and dimensioned to be retained within the enclosed flange of the furniture module bracket, the key distal edges of all keys also being sized and dimensioned to prevent the passage of the furniture leg bracket through the protrusion distal edge central opening except when each of the keys is aligned with a keyway, the furniture leg bracket is attached to the elongate support member such that the keys extend away from the longitudinal axis of the elongate support member;

wherein the furniture leg can be securely attached to the furniture module by (i) inserting the furniture leg bracket into the furniture leg attachment opening after aligning each key with a keyway and thrusting the proximal end of the elongate support member into the protrusion distal edge central opening, (ii) rotating the elongate support member to rotate the furniture leg bracket until the keys are no longer aligned with the keyways and until at least one key aperture is aligned with an inwardly extending protrusion securing aperture to form at least one aligned key aperture and inwardly extending protrusion securing aperture and (iii) securing the furniture module bracket to the furniture leg bracket with a fastener disposed within the at least one aligned key aperture and inwardly extending protrusion securing aperture.

2. The kit of claim 1 wherein the furniture leg bracket base plate upper surface is disposed along a furniture leg bracket upper surface plane and the furniture leg bracket is attached to the proximal end of the elongate support member such that the furniture leg bracket plane is disposed at an angle between about between about 75 deg. and about 90 deg. with respect to the longitudinal axis of the elongate support member.

3. The kit of claim 1 wherein the enclosed flange extends away from the furniture module bracket base plate lower surface by a distance of between about ¼ inches and about 1 inch.

4. The kit of claim 1 wherein the enclosed flange is disposed around a furniture module bracket base plate central opening.

5. The kit of claim 1 further comprising a furniture leg bracket contact plate disposed within the enclosed flange and wherein the furniture leg bracket contact plate has a lower surface which is not parallel with the furniture module bracket base plate upper surface.

6. The kit of claim 1 wherein each inwardly extending protrusion defines an inwardly extending protrusion securing aperture and each of the keys defines a key securing aperture.

7. The kit of claim 1 wherein the keys are defined along the furniture leg bracket base plate exterior edge such that, when one of the keys is aligned with a keyway in the furniture module bracket, all of the keys are aligned with a keyway.

8. A furniture assemblage comprising:
a) a furniture module having a bottom surface;
b) a furniture module bracket attached to the bottom surface of the furniture module, the furniture module bracket comprising:
  i) a furniture module bracket base plate having a furniture module bracket base plate upper surface and a furniture module bracket base plate lower surface;
  ii) an enclosed flange extending away from the furniture module bracket base plate lower surface, the enclosed flange forming a furniture leg attachment opening; and
  iii) at least three inwardly extending protrusions attached to the enclosed flange and spaced apart from one another to define a keyway between each pair of adjoining inwardly extending protrusions, each of the protrusions having a protrusion distal edge, the protrusion distal edges of all inwardly extending protrusions defining a protrusion distal edge central opening, at least one of the inwardly extending protrusions defining an inwardly extending protrusion securing aperture; and
c) at least three furniture legs attached to the furniture module, each furniture leg comprising:
  i) an elongate support member having a proximal end, a distal end and a longitudinal axis; and
  ii) a furniture leg bracket attached to the proximal end of the elongate support member, the furniture leg bracket comprising a furniture leg bracket base plate having a furniture leg bracket base plate upper surface, a furniture leg bracket base plate lower surface and a furniture leg bracket base plate exterior edge, the furniture leg bracket base plate exterior edge defining at least three outwardly extending keys spaced apart from one another, each key being sized and dimensioned to pass through a keyway between a pair of adjoining inwardly extending protrusions in the furniture module bracket, at least one of the keys defining a key securing aperture, each of the keys having a key distal edge, the key distal edges of all keys being sized and dimensioned to be retained within the enclosed flange of the furniture module bracket, the key distal edges of all keys also being sized and dimensioned to prevent the passage of the furniture leg bracket through the protrusion distal edge central opening except when each of the keys is aligned with a keyway, the furniture leg bracket is attached to the elongate support member such that the keys extend away from the longitudinal axis of the elongate support member;

wherein each of the three furniture legs is attached to the furniture module with the furniture leg bracket disposed within the furniture leg attachment opening such that (i) each key is within the protrusion distal edge central opening, (ii) each key in unaligned with a keyway, (iii) at least one key aperture is aligned with an inwardly extending protrusion securing aperture to form at least one aligned key aperture and inwardly extending protrusion securing aperture and (iv) the furniture module bracket is secured to the furniture leg bracket with a fastener disposed within the at least one aligned key aperture and inwardly extending protrusion securing aperture.

9. The furniture assemblage of claim 8 wherein the enclosed flange extends away from the furniture module bracket base plate lower surface by a distance of between about ¼ inch and about 1 inch.

10. The furniture assemblage of claim 8 further comprising a furniture leg bracket contact plate disposed within the enclosed flange and wherein the furniture leg bracket contact plate has a lower surface which is not parallel with the furniture module bracket base plate upper surface.

11. The furniture assemblage of claim 8 wherein each inwardly extending protrusion defines an inwardly extending protrusion securing aperture and each of the keys defines a key securing aperture.

12. The furniture assemblage of claim 8 wherein an inlayed nut is retained within the bottom surface of the furniture module opposite each inwardly extending protrusion securing aperture, such that the furniture module bracket can be secured to the furniture leg bracket with a bolt disposed within the at least one aligned key aperture and an inwardly extending protrusion securing aperture, each bolt being secured to an inlayed nut.

13. The furniture assemblage of claim 8 wherein the keys are defined along the furniture leg bracket base plate exterior edge such that, when one of the keys is aligned with a keyway in the furniture module bracket, all of the keys are aligned with a keyway.

* * * * *